UNITED STATES PATENT OFFICE.

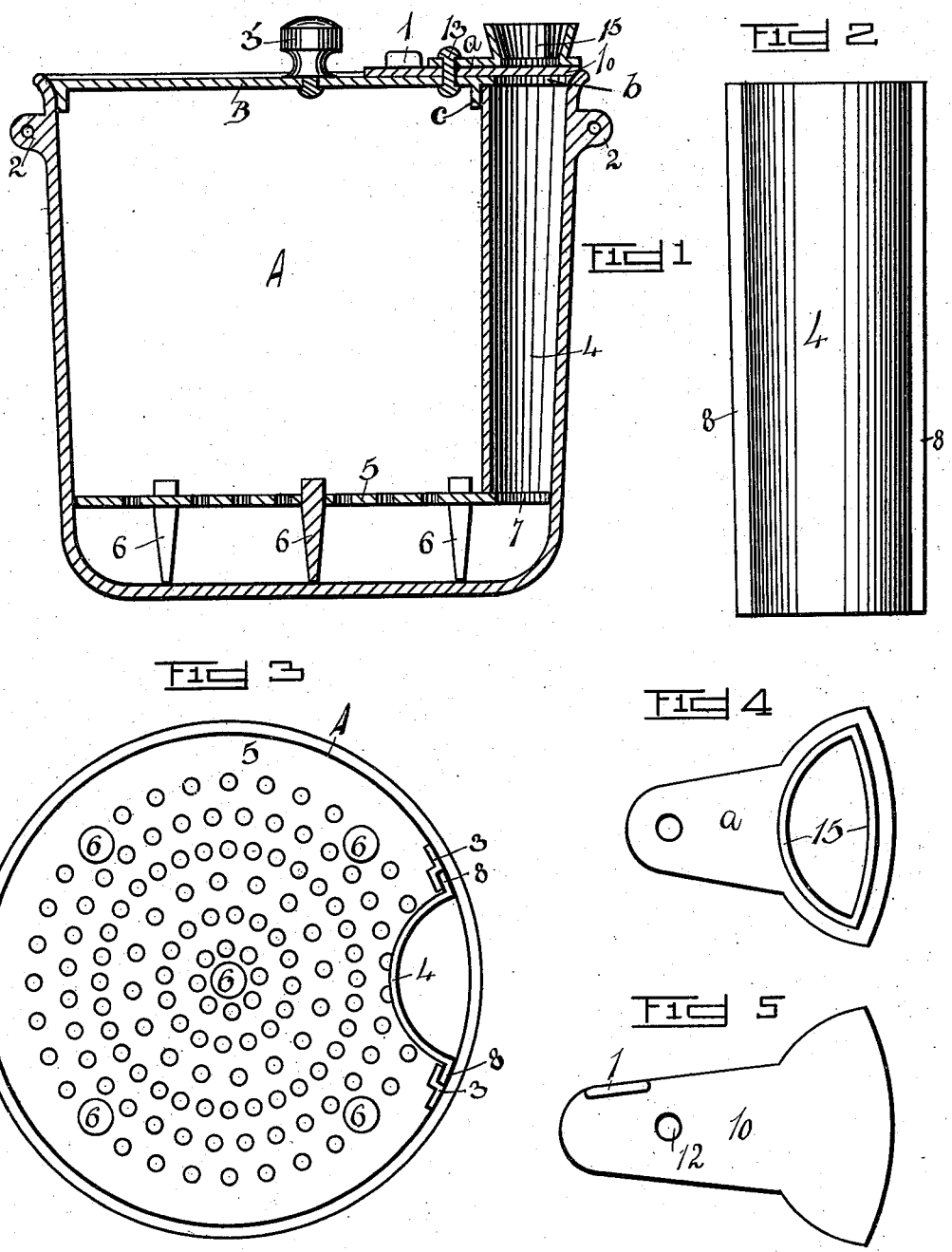

CARL F. KAUL, OF MADISON, NEBRASKA.

DINNER-POT.

SPECIFICATION forming part of Letters Patent No. 687,240, dated November 26, 1901.

Application filed April 24, 1901. Serial No. 57,242. (No model.)

*To all whom it may concern:*

Be it known that I, CARL F. KAUL, residing at Madison, in the county of Madison and State of Nebraska, have invented certain useful Improvements in Dinner-Pots; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in dinner-pots.

The object of my invention is to provide a dinner-pot so constructed that the materials to be boiled may be thoroughly cooked without coming in contact with any part of the pot likely to scorch the same, and my invention embodies certain other advantages more fully set forth hereinafter.

In the accompanying drawings I have shown in Figure 1 a sectional view of a dinner-pot embodying my invention with the bail or handle removed. Fig. 2 shows the removable shield as used in my invention. Fig. 3 shows a top view of the pot, disclosing the lid removed. Fig. 4 shows a detached top view of the spout as used in my invention, while Fig. 5 shows a detached enlarged top view of the spout-closing lid as employed in my invention.

My invention comprises an ordinary dinner-pot of any suitable size, shape, or material, which is preferably provided with the usual bail-ears 2 2, to which are secured a suitable handle. Placed within this pot at suitable points are the flanges 3 3, which provide a suitable seating for the laterally-extending edges 8 8 of the preferably semicircular shield 4, as is shown in Figs. 2 and 3.

Adapted to rest within the bottom of the pot upon a plurality of pins 6, which project both below and above, is a perforated disk 5, which disk 5 has a removed portion, as is shown in Fig. 1 at 7. As constructed the perforated disk 5 is a suitable distance above the bottom of the pot A and supported by means of the pins 6. Resting upon this perforated disk 5 is a shield 4, which is removably held below the flanges 3 3.

Adapted to fit into the pot A is a suitable lid B, which is provided with an opening *b* and a semicircular flange *c*, which flange is adapted to surround the shield 4, as is shown in Fig. 1 at the upper end. This shield 4 is adapted to rest upon the perforated disk 5 and so provide a duct, as it were, leading from the bottom of the dinner-pot upward through the lid-opening *b*. This opening *b* is closed by means of a sliding top 10, (shown in detail in Fig. 5,) provided with an opening 12 and an upwardly-extending thumb-piece or finger-hold 1, so that this slide 10 may be carried from side to side to uncover the opening *b*. Resting above the slide 10 is a spout 15, forming part of a plate *a*, through an opening in which passes the rivet 13, so that this lid B is provided with the sliding top 10 and the spout 15.

Now when a pot constructed according to my invention is to be used the materials to be boiled are placed within the pot upon the perforated disk 5, when a small amount of water is poured through the spout 15 after the sliding lid 10 has been shoved away, so that the water passes down the duct and partially fills the space within the pot below the perforated disk 5. The pot is then placed upon the stove and the lid B being sufficiently heavy the steam generating below the disk 5 passes through the openings in the same and fills the entire pot, thus steaming and thoroughly cooking the goods within the same. On opening the slide 10 if it is found that no steam arises through the duct 4 an additional amount of water is poured through this duct, which can, it will be noticed, be done without any of the steam escaping which is above the perforated disk 5, so that while the new water is admitted to the pot the conditions within the pot proper are not materially changed. From this it will be noticed that I provide a dinner-pot which is divided into two portions, an upper and lower portion, divided by means of a perforated dividing-disk, and from the lower division extends a duct through the lid of the pot, which is preferably made steam-tight.

When materials—such as rice, for instance—are to be boiled, they may be placed in an earthenware or other dish and put within the pot to rest upon the projecting leg 6, and the rice is then thoroughly cooked without any chance of scorching the same. Meats are likewise cooked in placing the same upon the perforated disk 5 and adding from time to time simply sufficient water through the duct to insure a proper amount of steam within the pot.

In case the pot is to be used for other purposes the bottom 5 and the shield 4 are removed, when the pot is in the form of any ordinary pot, with the exception of the little flanges 3, which in no way interfere with the operation.

For the sake of convenience, if desired, the pot 4 may be provided with an outwardly-extending bulge, so that a preferably straight shield could be used in providing the steam-duct. This arrangement would slightly increase the capacity of the pot.

Having thus described my said invention, what I claim as new, and desire to secure by United States Letters Patent, is—

The combination in a dinner-pot, of two flanges within said pot, a perforated plate within said pot provided with upwardly and downwardly projecting supporting-pins and a duct-opening, a duct-forming shield working below said flanges, resting upon said perforated plate, and registering with said duct-opening, a lid for said pot provided with a suitable opening adapted to register with said shield, a slide to cover said lid-opening and a spout above said slide and registering with said lid-opening, as and for the purpose set forth.

Signed in presence of two witnesses.

CARL F. KAUL.

Witnesses:
GEORGE W. SUES,
R. J. DAVENPORT.